(12) United States Patent
Besnard et al.

(10) Patent No.: US 11,702,491 B2
(45) Date of Patent: Jul. 18, 2023

(54) MEMBRANE INCLUDING FLUOROPOLYMER HYBRID ORGANIC/INORGANIC COMPOSITE, AND ELECTROCHEMICAL DEVICE HAVING THE SAME

(71) Applicants: SOLVAY SA, Brussels (BE); COMMISSARIAT A L'ENERGIE ATOMIQUE ET AUX ENERGIES ALTERNATIVES, Paris (FR)

(72) Inventors: Gaëlle Besnard, Grenoble (FR); Elise Gutel, Veurey-Voroize (FR); Hélène Rouault, Le Versoud (FR); Julio A. Abusleme, Saronno (IT); Ségolène Brusseau, Tavaux (FR); Marc-David Braida, Bry-sur-Marne (FR); Djamel Mourzagh, Sassenage (FR); Daniel Tomasi, Villard Saint Christophe (FR)

(73) Assignees: Solvay SA, Brussels (BE); Commissariat à l'Énergie Atomique et aux Énergies Aternatives, Paris (FR)

( * ) Notice: Subject to any disclaimer, the term of this patent is extended or adjusted under 35 U.S.C. 154(b) by 216 days.

(21) Appl. No.: 16/771,660

(22) PCT Filed: Dec. 11, 2018

(86) PCT No.: PCT/EP2018/084296
§ 371 (c)(1),
(2) Date: Jun. 10, 2020

(87) PCT Pub. No.: WO2019/115500
PCT Pub. Date: Jun. 20, 2019

(65) Prior Publication Data
US 2021/0087314 A1 Mar. 25, 2021

(30) Foreign Application Priority Data

Dec. 13, 2017 (EP) .................................... 17306762

(51) Int. Cl.
| | |
|---|---|
| C08F 214/22 | (2006.01) |
| H01M 50/403 | (2021.01) |
| H01M 50/426 | (2021.01) |
| H01M 50/446 | (2021.01) |
| C08K 5/5415 | (2006.01) |
| C08K 5/5435 | (2006.01) |
| H01M 10/0525 | (2010.01) |

(52) U.S. Cl.
CPC ........ C08F 214/225 (2013.01); C08K 5/5415 (2013.01); C08K 5/5435 (2013.01); H01M 10/0525 (2013.01); H01M 50/403 (2021.01); H01M 50/426 (2021.01); H01M 50/446 (2021.01)

(58) Field of Classification Search
CPC ............. H01M 50/403; H01M 50/426; H01M 50/446; C08F 214/225; C08K 5/5415; C08K 5/5435
USPC ................................ 429/251, 254, 302, 303
See application file for complete search history.

(56) References Cited

U.S. PATENT DOCUMENTS

| | | | | |
|---|---|---|---|---|
| 2014/0120269 | A1* | 5/2014 | Abusleme | ............ H01M 50/411 |
| | | | | 427/532 |
| 2015/0194271 | A1* | 7/2015 | Toniolo | .................... C08K 3/36 |
| | | | | 429/316 |
| 2015/0284519 | A1 | 10/2015 | Frache et al. | |
| 2015/0322187 | A1* | 11/2015 | Miele | .................. H01M 50/406 |
| | | | | 526/255 |
| 2017/0073483 | A1 | 3/2017 | Ducros et al. | |

FOREIGN PATENT DOCUMENTS

| | | | |
|---|---|---|---|
| WO | 2015169834 | A1 | 11/2015 |
| WO | 2019115502 | A2 | 6/2019 |

* cited by examiner

*Primary Examiner* — Sean P Cullen
(74) *Attorney, Agent, or Firm* — Osha Bergman Watanabe & Burton LLP

(57) ABSTRACT

The present invention pertains to a membrane for an electrochemical device, to a process for manufacturing said membrane and to use of said membrane in a process for manufacturing an electrochemical device.

20 Claims, No Drawings

MEMBRANE INCLUDING FLUOROPOLYMER HYBRID ORGANIC/INORGANIC COMPOSITE, AND ELECTROCHEMICAL DEVICE HAVING THE SAME

CROSS-REFERENCE TO RELATED APPLICATIONS

This application is a U.S. national stage entry under 35 U.S.C. § 371 of International Application No. PCT/EP2018/084296 filed Dec. 11, 2018, which claims priority to European application No. EP 17306762.0, filed on Dec. 13, 2017. The entire contents of these applications are explicitly incorporated herein by this reference.

TECHNICAL FIELD

The present invention pertains to a membrane for an electrochemical device, to a process for manufacturing said membrane and to the use of said membrane in a process for manufacturing an electrochemical device.

BACKGROUND ART

Fluoropolymers and, in particular, vinylidene fluoride polymers are used in a wide variety of applications including electrochemical applications.

For instance, fluoropolymers are advantageously used as raw materials in the manufacture of either electrodes or membranes suitable for use in electrochemical devices, such as secondary batteries, because of their chemical and thermal aging resistance.

Alkaline or alkaline-earth secondary batteries are typically formed by assembling a positive electrode (cathode), an ion conducting membrane and a negative electrode (anode). The ion conducting membrane often referred to as separator, plays a crucial role in the battery as it must provide for a high ionic conductivity while ensuring effective separation between the opposite electrodes.

Electrolytes suitable for use in electrochemical devices such as secondary batteries typically include liquid electrolytes and solid electrolytes. In order for electrolytes to be suitable for use in secondary batteries, they should exhibit high ionic conductivity, high chemical and electrochemical stability toward the electrodes and high thermal stability over a wide range of temperatures.

Liquid electrolytes suitable for use in Lithium-ion secondary batteries typically comprise metal salts such as Lithium salts dissolved in proper organic solvents.

However, critical safety issues may arise from overheating when a liquid electrolyte is heated above its flash point. In particular, thermal runaway may occur at high temperatures through chemical reaction of oxygen released by the cathode material with the organic liquid electrolyte as fuel.

In order to solve safety issues in Lithium-ion secondary batteries, gel polymer electrolytes have been studied which advantageously combine the advantages of both liquid electrolytes and solid polymer electrolytes thus being endowed with high ionic conductivity and high thermal stability.

Electrolyte membranes based on said gel polymer electrolytes can be prepared.

The preparation of membranes for use in secondary batteries is suitably done by continuous processes, but it is necessary to endow the membranes with good mechanical properties.

In said continuous processes, the membrane is in fact put under tension in the coating machine and in some cases the membrane must be detached from a substrate before installing it in the battery. In that process the membrane must not be damaged and it should be an easy process to do it. A difficult handling of the same could make impossible the industrialisation of the membrane preparation.

Membranes known in the art, prepared by using gel electrolytes, face the above-mentioned problems during the preparation by continuous processes.

Thus, the need is felt for gel electrolyte/membrane electrolyte capable of being produced by continuous processes in a coating machine, said membrane being endowed with good mechanical properties and being suitable for use in electrochemical devices, in particular in secondary batteries such as Lithium-ion batteries, exhibiting outstanding capacity values while properly ensuring safety requirements.

SUMMARY OF INVENTION

It has been now surprisingly found that an electrochemical device, especially a secondary battery, can be easily manufactured by using the membrane of the invention.

It has been also surprisingly found that the membrane of the invention can be produced in a continuous process in a coating machine without suffering the deficiencies of the membranes known in the art.

In a first object, the present invention provides a membrane for an electrochemical device, said membrane comprising, preferably consisting of:

(a) at least one fluoropolymer hybrid organic/inorganic composite comprising inorganic domains [polymer (F-h)], said hybrid being obtained by reaction between:
  at least one fluoropolymer [polymer (F)] comprising:
    (i) recurring units derived from at least one fluorinated monomer (FM),
    (ii) recurring units derived from at least one (meth) acrylic monomer [monomer (MA)] of formula:

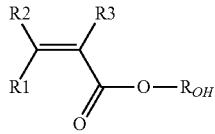

wherein each of R1, R2, R3, equal or different from each other, is independently a hydrogen atom or a $C_1$-$C_3$ hydrocarbon group, and $R_{OH}$ is a $C_1$-$C_5$ hydrocarbon moiety comprising at least one hydroxyl group, and
    (iii) optionally recurring units derived from at least one fluorinated monomer (FM2) different from VDF;
  wherein polymer (F) has an intrinsic viscosity measured in dimethylformamide at 25° C.
  higher than 0.90 dl/g and lower than 6.0 dl/g; and
  at least one metal compound [compound (M)] of formula (I):

$$X_{4-m}AY_m \qquad (I)$$

wherein m is an integer from 1 to 4, A is a metal selected from the group consisting of Si, Ti and Zr, Y is a hydrolysable group, X is a hydrocarbon group, optionally comprising one or more functional groups, wherein the inorganic domains are obtained by grafting at least one compound (M) to the polymer (F) through reaction of said a least one compound (M) with at least a fraction of the $R_{OH}$ groups of the (meth)acrylic monomer (MA); and
(b) a liquid medium [medium (L)].

In a second object, the present invention provides a process for the manufacture of a membrane for an electrochemical device.

In a third object, the present invention provides an electrochemical device, preferably a secondary battery, comprising at least one membrane of the invention between a positive electrode and a negative electrode.

DESCRIPTION OF EMBODIMENTS

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane).

The polymer (F) is a fluoropolymer comprising recurring units derived from at least one monomer (FM) and recurring units derived from at least one monomer (MA).

By the term "fluorinated monomer" it is hereby intended to denote an ethylenically unsaturated monomer comprising at least one fluorine atom.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one (meth)acrylic monomer [monomer (MA)]" is understood to mean that the polymer (F) may comprise recurring units derived from one or more than one(meth)acrylic monomers. In the rest of the text, the expression "(meth)acrylic monomers" is understood, for the purposes of the present invention, both in the plural and the singular, that is to say that they denote both one or more than one (meth)acrylic monomers as defined above.

Should the fluorinated monomer (FM) comprise at least one hydrogen atom, it is designated as hydrogen-containing fluorinated monomer.

Should the fluorinated monomer be free of hydrogen atoms, it is designated as per(halo)fluorinated monomer.

The fluorinated monomer (FM) may further comprise one or more other halogen atoms (Cl, Br, I).

Non-limiting examples of suitable fluorinated monomer (FM) include, notably, the followings:
  $C_2$-$C_8$ perfluoroolefins such as tetrafluoroethylene and hexafluoropropylene;
  $C_2$-$C_8$ hydrogenated fluoroolefins such as vinylidene fluoride, vinyl fluoride, 1,2-difluoroethylene and trifluoroethylene;
  perfluoroalkylethylenes of formula $CH_2=CH-R_{f0}$ wherein $R_{f0}$ is a $C_1$-$C_6$ perfluoroalkyl;
  chloro- and/or bromo- and/or iodo-$C_2$-$C_6$ fluoroolefins such as chlorotrifluoroethylene;
  $CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;
  functional (per)fluoro-oxyalkylvinylethers of formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;
  fluorodioxoles, preferably perfluorodioxoles.

In a preferred embodiment according to the invention, the polymer (F) is advantageously a random polymer [polymer $(F_R)$] comprising linear sequences of randomly distributed recurring units derived from at least one fluorinated monomer at least one monomer (MA).

The expression "randomly distributed recurring units" is intended to denote the percent ratio between the average number of sequences of at least one monomer (MA), said sequences being comprised between two recurring units derived from at least one fluorinated monomer, and the total average number of recurring units derived from at least one monomer (MA).

When each of the recurring units derived from at least one monomer (MA) is isolated, that is to say that a recurring unit derived from a monomer (MA) is comprised between two recurring units of at least one fluorinated monomer, the average number of sequences of at least one monomer (MA) equals the average total number of recurring units derived from at least one monomer (MA), so that the fraction of randomly distributed recurring units derived from at least one monomer (MA) is 100%: this value corresponds to a perfectly random distribution of recurring units derived from at least one monomer (MA). Thus, the larger is the number of isolated recurring units derived from at least one monomer (MA) with respect to the total number of recurring units derived from at least one monomer (MA), the higher will be the percentage value of fraction of randomly distributed recurring units derived from at least one monomer MA).

The polymer (F) may further optionally comprise recurring units derived from at least one hydrogenated monomer, different from the monomer (MA).

By the term "hydrogenated monomer" it is hereby intended to denote an ethylenically unsaturated monomer comprising at least one hydrogen atom and free from fluorine atoms.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote either one or more than one hydrogenated monomers as defined above.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

The polymer (F) comprises preferably at least 0.01% by moles, more preferably at least 0.05% by moles, even more preferably at least 0.1% by moles of recurring units derived from at least one monomer (MA).

The polymer (F) comprises preferably at most 10% by moles, more preferably at most 5% by moles, even more preferably at most 3% by moles of recurring units derived from at least one monomer (MA).

Determination of average mole percentage of recurring units derived from at least one monomer (MA)] in the polymer (F) can be performed by any suitable method. Mention can be notably made of acid-base titration methods or NMR methods.

The polymer (F) is preferably a partially fluorinated fluoropolymer.

For the purpose of the present invention, the term "partially fluorinated fluoropolymer" is intended to denote a polymer comprising recurring units derived from at least one fluorinated monomer and recurring units derived from at least one monomer (MA) wherein the fluorinated monomer comprises at least one hydrogen atom.

According to a first embodiment of the invention, the polymer (F) is preferably a partially fluorinated fluoropolymer comprising recurring units derived from vinylidene fluoride (VDF), at least one monomer (MA) and at least one fluorinated monomer (FM2).

The polymer (F) of this first embodiment of the invention more preferably comprises recurring units derived from:
- at least 60% by moles, preferably at least 75% by moles, more preferably at least 85% by moles of vinylidene fluoride (VDF),
- from 0.01% to 10% by moles, preferably from 0.05% to 5% by moles, more preferably from 0.1% to 3% by moles of at least one monomer (MA), and
- from 0.1% to 15% by moles, preferably from 0.1% to 12% by moles, more preferably from 0.1% to 10% by moles of at least one monomer (FM2) selected from vinyl fluoride (VF$_1$), chlorotrifluoroethylene (CTFE), hexafluoropropylene (HFP), tetrafluoroethylene (TFE) and trifluoroethylene (TrFE).

Non limitative examples of monomer (MA) comprising at least one hydroxyl end group include, notably, hydroxyethyl (meth)acrylate, hydroxypropyl(meth)acrylate, hydroxyethylhexyl(meth)acrylate.

The monomer (MA) is preferably selected from the followings:

hydroxyethyl acrylate (HEA) of formula:

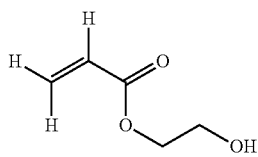

2-hydroxypropyl acrylate (HPA) of either of formulae:

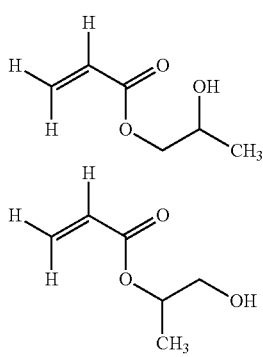

and mixtures thereof.

The polymer (F) is typically obtainable by polymerization of at least one fluorinated monomer, at least one monomer (MA) as above defined, and, optionally, a fluorinated monomer (FM2).

The polymer (F) is typically obtainable by emulsion polymerization or suspension polymerization.

Preferably the intrinsic viscosity of polymer (F), measured in dimethylformamide at 25° C., is lower than 5.0 dl/g, more preferably lower than 4.5 dl/g.

The polymer (F-h) typically comprises, preferably consists of, fluoropolymer domains and inorganic domains.

The polymer (F-h) may be prepared according to the procedure described, as an example, in WO 2015/169834.

In particular, polymer (F-h) may be prepared by a process that comprises:
- a first step of reacting, in the presence of a liquid medium [medium (L)], at least a fraction of the at least one hydroxyl group on the R$_{OH}$ of monomer (MA) of polymer (F) with at least a fraction of compound (M), leading to a polymer (F) that includes pendant groups of formula —Y$_{m-1}$AX$_{4-m}$, with m, Y, A and X having same meaning as above detailed; and
- a second step of hydrolysing and/or condensing compound (M) and/or the at least one pendant group of polymer (F) obtained in the first step.

Polymer (F-h) is conveniently obtained in the form of a solution in the liquid medium (L).

In the second step, the process comprises hydrolyzing and/or polycondensing compound (M) and/or pendant —Y$_{m-1}$AX$_{4-m}$ groups, as above detailed to yield a polymer (F-h).

The hydrolysis/polycondensation can be carried out simultaneously to the step of reacting hydroxyl groups of polymer (F) and compound (M) in the first step or can be carried out once said reaction has occurred.

Typically, in particular for compounds wherein A=Si, this hydrolysis/polycondensation is initiated by addition of appropriate catalyst/reactant. Generally, water or a mixture of water and an acid can be used for promoting this reaction.

The choice of the acid is not particularly limited; both organic and inorganic acids can be used. HCl and formic acid are among the preferred acids which can be used in the process of the invention.

In case of reaction between polymer (F) and compound (M) in the molten state, injection of water vapour, optionally in combination with a volatile acid, will be the preferred method for promoting the hydrolysis/polycondensation.

In case of reaction between polymer (F) and compound (M) in solution, addition of an aqueous medium preferably comprising an acid will be the preferred method for promoting the hydrolysis/polycondensation.

While this hydrolysis/polycondensation can take place at room temperature, it is generally preferred to carry out this step upon heating at a temperature exceeding 50° C.

In case of reaction in the molten state, temperatures will range from 150 to 250° C. as a function of the melting point of the polymer (F); in case of reaction in solution, temperatures will be selected having regards to the boiling point of the solvent. Generally temperatures between 50 and 150° C., preferably between 60° C. and 120° C. will be preferred.

It is understood that in this step, hydrolysable group(s) of the compound (M) will react so as to yield a hybrid composite comprising polymer domain consisting of chains of polymer (F) and inorganic domains consisting of residues derived from compound (M).

The fluoropolymer hybrid organic/inorganic composite comprising inorganic domains can be recovered from standard methods, which will depend upon techniques used in various reaction steps.

The selection of the hydrolysable group Y of the compound (M) of formula (I) as defined above is not particularly limited, provided that it enables under appropriate conditions the formation of a —O-A≡ bond between A of the compound (M) and the —O— atom belonging to the hydroxyl group on the $R_{OH}$ of monomer (MA). The hydrolysable group Y of the compound (M) as defined above is typically selected from the group consisting of halogen atoms, preferably being a chlorine atom, hydrocarboxy groups, acyloxy groups and hydroxyl groups.

According to a preferred embodiment, X in compound (M) is $R^A$ and Y is $OR^B$, wherein $R^A$ and $R^B$, equal to or different from each other and at each occurrence, are independently selected from $C_1$-$C_{18}$ hydrocarbon groups, wherein $R^A$ optionally comprises at least one functional group.

In case the compound (M) as defined above comprises at least one functional group on X, it will be designated as functional compound (M1); in case none of X of the compound (M) as defined above comprise a functional group, the compound (M) will be designated as non-functional compound (M2).

Non-limiting examples of functional groups that can be on X include, notably, epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

According to a more preferred embodiment, compound (M) is the compound (M1) wherein m is an integer from 1 to 3, A is a metal selected from the group consisting of Si, Ti and Zr, X is $R^{A'}$ and Y is $OR^{B'}$, wherein $R^{A'}$ is a $C_1$-$C_{12}$ hydrocarbon group comprising at least one functional group and $R^{B'}$ is a $C_1$-$C_5$ linear or branched alkyl group, preferably $R^{B'}$ being a methyl or ethyl group.

Examples of functional compounds (M1) are notably vinyltriethoxysilane, vinyltrimethoxysilane, vinyltrismethoxyethoxysilane of formula $CH_2$=$CHSi(OC_2H_4OCH_3)_3$, 2-(3,4-epoxycyclohexylethyltrimethoxysilane) of formula:

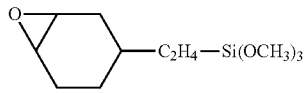

glycidoxypropylmethyldiethoxysilane of formula:

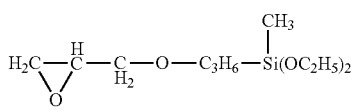

glycidoxypropyltrimethoxysilane of formula:

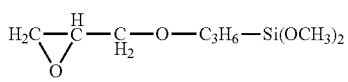

methacryloxypropyltrimethoxysilane of formula:

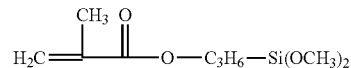

aminoethylaminpropylmethyldimethoxysilane of formula:

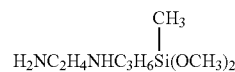

aminoethylaminpropyltrimethoxysilane of formula:
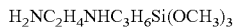

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

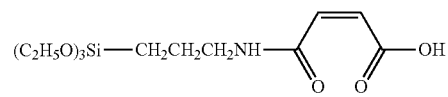

3-(trihydroxysilyl)-1-propane-sulphonic acid of formula $HOSO_2$—$CH_2CH_2CH_2$—$Si(OH)_3$, N-(trimethoxysilylpropyl)ethylene-diamine triacetic acid, and its sodium salts, 3-(triethoxysilyl)propylsuccinic anhydride of formula:

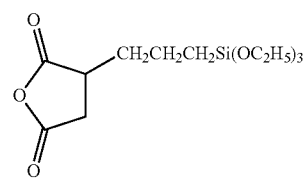

acetamidopropyltrimethoxysilane of formula $H_3C$—$C(O)NH$—$CH_2CH_2CH_2$—$Si(OCH_3)_3$, alkanolamine titanates of formula $Ti(L)_t(OR)_z$, wherein L is an amine-substituted alkoxy group, e.g. $OCH_2CH_2NH_2$, R is an alkyl group, and x and y are integers such that t+z=4.

Examples of non-functional compounds (M2) are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

According to another preferred embodiment, X in compound (M) is a $C_1$-$C_{12}$ hydrocarbon group comprising at least one —N=C=O functional group and wherein A and Y are as above defined; in this case, compound (M) will be designated compound (M').

According to a still more preferred embodiment, in compound (M') Y is $OR^D$, wherein $R^D$ is a $C_1$-$C_5$ linear or branched alkyl group, preferably $R^D$ being a methyl or ethyl group.

Non-limiting examples of suitable compounds (M') according to this embodiment include the followings: trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate and triethoxysilyl hexyl isocyanate.

According to a preferred embodiment, the at least one polymer (F-h) comprised in the membrane of the invention is obtained by reaction between:

at least one [polymer (F)] as above defined,
at least one metal compound (M') as above defined; and
at least one metal compound (M2) as defined above.

For the purpose of the present invention, the term "liquid medium [medium (L)]" is intended to denote a medium comprising one or more substances in the liquid state at 20° C. under atmospheric pressure.

The medium (L) comprises at least one metal salt (MS).
The medium (L) is typically free from one or more solvents (S).

The choice of the medium (L) is not particularly limited, provided that it is suitable for solubilizing the metal salt (MS).

The amount of the medium (L) in the membrane of the invention is typically at least 40% by weight, preferably at least 50% by weight, more preferably at least 60% by weight, based on the total weight of said medium (L) and the at least one polymer (F-h).

According to a preferred embodiment of the invention, the liquid medium (L) comprises at least one organic carbonate.

Non-limiting examples of suitable organic carbonates include, notably, ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

Other suitable liquid medium (L) may comprise esters, preferably ethylpropionate or propylpropionate, acetonitrile, γ-butyrolactone, dimethylether, 1,2 dimethoxyethane and fluorocarbonate.

The metal salt (MS) is typically selected from the group consisting of: (a) MeI, Me(PF$_6$)$_n$, Me(BF$_4$)$_n$, Me(ClO$_4$)$_n$, Me(bis(oxalato)borate)$_n$("Me(BOB)$_n$"), MeCF$_3$SO$_3$, Me[N(CF$_3$SO$_2$)$_2$]$_n$, Me[N(C$_2$F$_5$SO$_2$)$_2$]$_n$, Me[N(CF$_3$SO$_2$)(RFSO$_2$)]$_n$, wherein RF is C$_2$F$_5$, C$_4$F$_9$ or CF$_3$OCF$_2$CF$_2$, Me(AsF$_6$)$_n$, Me[C(CF$_3$SO$_2$)$_3$]$_n$, Me$_2$Sn, wherein Me is a metal, preferably a transition metal, an alkaline metal or an alkaline-earth metal, more preferably Me being Li, Na, K, Cs, Mg, Ca and Al even more preferably Me being Li, and n is the valence of said metal, (b)

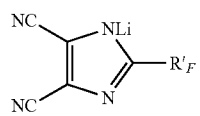

wherein R'$_F$ is selected from the group consisting of F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_1$, C$_3$F$_5$OCF$_3$, C$_2$F$_4$OCF$_3$, C$_2$H$_2$F$_2$OCF$_3$ and CF$_2$OCF$_3$, and (c) combinations thereof.

Preferably, the metal salt is LiPF$_6$.

The concentration of the metal salt (MS) in the medium (L) of the membrane of the invention is advantageously at least 0.01 M, preferably at least 0.025 M, more preferably at least 0.05 M.

The concentration of the metal salt (MS) in the medium (L) of the membrane of the invention is advantageously at most 5 M, preferably at most 2 M, more preferably at most 1 M.

In a second object, the present invention provides a process for the manufacture of a membrane for an electrochemical device, said process comprising:

(A) providing at least one solution of polymer (F-h) as above defined in a liquid medium ((L);

(B) processing the solution obtained in step (A) into a polymer electrolyte membrane; and (C) drying the polymer electrolyte membrane provided in step (B).

In step (B), the solution of polymer (F-h) in liquid medium (L) can be processed either in a continuous or a non-continuous process.

In the continuous process, the solution is fed into a coating machine capable of laying sheet materials, such as a roll-to-roll slot-die coating machine.

The continuous process in the coating machine is preferably carried out at room temperature in controlled environment.

In the non-continuous process, the solution is suitably spread with a constant thickness onto an inert substrate using a tape casting machine, such as a doctor blade, in a dry room.

The membrane for an electrochemical device of the invention is advantageously obtainable by the process according to this second object of the invention.

The membrane of the invention is particularly suitable for use in electrochemical devices, in particular in secondary batteries.

For the purpose of the present invention, the term "secondary battery" is intended to denote a rechargeable battery.

The secondary battery of the invention is preferably a secondary battery based on any of Lithium (Li), Sodium (Na), Potassium (K), Magnesium (Mg), Calcium (Ca), Zinc (Zn), Aluminium (Al) and Yttrium (Y).

The secondary battery of the invention is more preferably a Lithium-ion secondary battery.

In a third object, the present invention provides an electrochemical device, preferably a secondary battery, comprising at least one membrane of the invention between a positive electrode and a negative electrode.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Raw Materials

Polymer 1: VDF-AA (0.9% by moles)-HFP (2.4% by mole) polymer having an intrinsic viscosity of 3.0 dl/g in DMF at 25° C.

Polymer 2-Comp: VDF-HEA (0.8% by moles)-HFP (2.4% by mole) polymer having an intrinsic viscosity of 0.770 dl/g in DMF at 25° C.

Polymer (F-A): VDF-HEA (0.6% by moles)-HFP (2.5% by mole) polymer having an intrinsic viscosity of 0.970 dl/g in DMF at 25° C.

Polymer 2-Comp: VDF-HEA (0.8% by moles)-HFP (2.4% by mole) polymer having an intrinsic viscosity of 0.077 l/g in DMF at 25° C.

Polymer (F-A): VDF-HEA (0.6% by moles)-HFP (2.5% by mole) polymer having an intrinsic viscosity of 0.097 l/g in DMF at 25° C.

$LiPF_6$: Lithium hexafluorophosphate salt.

NMC: $LiNi_{0.33}Mn_{0.33}Co_{0.33}O_2$, commercially available from Umicore.

Liquid medium (L-A): solution of $LiPF_6$ (1 mol/L) in ethylene carbonate (EC)/propylene carbonate (PC) (1/1 by volume) comprising vinylene carbonate (VC) (2% by weight).

Graphite: 75% SMG HE2-20 (Hitachi Chemical Co., Ltd.)/25% TIMREX® SFG 6.

DBTDL: dibutyl tin dilaurate.

TEOS: tetraethoxysilane.

TSPI: 3-(triethoxysilyl)propyl isocyanate.

Synthesis of Polymer 1 (not According to the Invention):

In a 80 litres reactor equipped with an impeller running at a speed of 250 rpm were introduced, in sequence, 50.4 kg of demineralised water and 0.6 g/kg MnT of ethyl hydroxyethylcellulose derivative (commercially available as Bermocoll® E 230 FQ from AkzoNobel).

The reactor was purged with sequence of vacuum (30 mmHg) and purged of nitrogen at 20° C. Then, 3.0 g/kgMnT of t-amyl-perpivalate in isododecane (a 75% by weight solution of t-amyl-perpivalate, commercially available from Arkema) were added. The speed of the stirring was increased at 300 rpm. Finally, acrylic acid (AA, Initial amount) and hexafluoropropylene (HFP) monomers were introduced in the reactor, followed by vinylidene fluoride (VDF). The amounts of monomers and temperature conditions are specified in Table 1.

The reactor was gradually heated until a set-point temperature at fixed temperature as described in the table and the pressure was fixed at 120 bar. The pressure was kept constantly equal to 120 bar by feeding a certain amount of AA (Feeding amount) diluted in an aqueous solution with a concentration of AA as specified in Table 1 ([AA] in water). After this feeding, no more aqueous solution was introduced and the pressure started to decrease. Then, the polymerization was stopped by degassing the reactor until reaching atmospheric pressure. The polymer so obtained was then recovered, washed with demineralised water and oven-dried at 65° C.

TABLE 1

| Polymer | VDF kg | HFP kg | AA Initial g | AA feeding g ([AA] in water g/kg water) | T ° C. |
|---|---|---|---|---|---|
| 1 | 22.7 | 2.5 | 21.6 | 234 (14.3) | 52 | g/MnT means grams of product per Kg of the total amount of the comonomers (HFP, AA and VDF) introduced during the polymerization.

Synthesis of Polymer 2-Comp:

In a 80 lt. reactor equipped with an impeller running at a speed of 300 rpm were introduced in sequence 58242 g of demineralised water and 11.1 g of METHOCEL® K100 GR suspending agent (commercially available from Dow).

The reactor was purged with sequence of vacuum (30 mmHg) and purged of nitrogen at 14° C. Then, 149.9 g of a 75% by weight solution of t-amyl perpivalate initiator in isododecane were introduced in the reactor, followed by 21.6 g of hydroxyethylacrylate (HEA) and 1873 g of hexafluoropropylene (HFP) monomers. Finally, 16597 g of vinylidene fluoride (VDF) was introduced in the reactor. The reactor was gradually heated until a set-point temperature at 57° C. and the pressure was fixed at 110 bar. The pressure was kept constantly equal to 110 bars by feeding 13 kg of aqueous solution containing a 240.6 g of HEA during the polymerization. After this feeding, no more aqueous solution was introduced and the pressure started to decrease until 80 bar. Then, the polymerization was stopped by degassing the reactor until reaching atmospheric pressure. In general a conversion around 75% of monomers was obtained. The polymer so obtained was then recovered, washed with demineralised water and oven-dried at 65° C.

Synthesis of Polymer (F-A):

In a 80 lt. reactor equipped with an impeller running at a speed of 250 rpm were introduced in sequence 49992 g of demineralised water and 15.2 g of METHOCEL® K100 GR suspending agent. The reactor was purged with sequence of vacuum (30 mmHg) and purged of nitrogen at 20° C. Then 204.4 g of a 75% by weight solution of t-amyl perpivalate initiator in isododecane were introduced. The speed of the stirring was increased at 300 rpm. Finally, 20.4 g of hydroxyethylacrylate (HEA) and 2555 g of hexafluoropropylene (HFP) monomers were introduced in the reactor, followed by 22735 g of vinylidene fluoride (VDF) were introduced in the reactor. The reactor was gradually heated until a set-point temperature at 55° C. and the pressure was fixed at 120 bar. The pressure was kept constantly equal to 120 bars by feeding 16.9 kg of aqueous solution containing a 235 g of HEA during the polymerization. After this feeding, no more aqueous solution was introduced and the pressure started to decrease until 90 bar. Then, the polymerization was stopped by degassing the reactor until reaching atmospheric pressure. In general a conversion around 76% of monomers was obtained. The polymer so obtained was then recovered, washed with demineralised water and oven-dried at 65° C.

Mechanical Properties Procedure.

The mechanical properties are measured with a "Shimadzu Autograph AG-X Plus" at a speed test of 50 mm/min on a dumbbell test piece at room temperature.

Determination of intrinsic viscosity of polymer (F) Intrinsic viscosity (q) [dl/g] was measured using the following equation on the basis of dropping time, at 25° C., of a solution obtained by dissolving the polymer (F) in N,N-dimethylformamide at a concentration of about 0.2 g/dl using a Ubbelhode viscosimeter:

$$[\eta] = \frac{\eta_{sp} + \Gamma \cdot \ln \eta_r}{(1 + \Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r-1$, and $\delta$ is an experimental factor, which for polymer (F) corresponds to 3.

General Procedure for the Manufacture of Electrodes Using the Liquid Medium (L-A) at Pilot Scale with a Continuous Process.

Anode: A solution of polymer 1 in acetone was prepared at 60° C. and then brought to room temperature in an Argon glove box (02<2 ppm, H$_2$O<2 ppm).

In the next step, the liquid medium (L-A) was added to the solution so obtained.

The weight ratio [m$_{medium\ (L-A)}$/(m$_{medium\ (L-A)}$+m$_{polymer\ 1}$)]×100 was 75%.

Graphite was added to the solution so obtained in a weight ratio of 90/10 (graphite/polymer 1).

Cathode: The liquid medium (L-A) was added to the solution of polymer 1 in acetone with the weight ratio [m$_{medium\ (L-A)}$/(m$_{medium\ (L-A)}$+m$_{polymer\ 1}$)]×100 was 76.7%.

A composition comprising a blend of 50% by weight of C-NERGY® SUPER C65 carbon black and 50% by weight of VGCF® carbon fiber (CF) and NMC was added to the solution so obtained in a weight ratio of 92.8/7.2 ((CF+NMC)/polymer 1). The CF/NMC weight ratio was 7.7/92.3.

Electrode Coating Procedure

The solution mixture was fed into a roll-to-roll slot die coating machine (Ingecal—tailored made) in a controlled dried environment (dew point of −20° C. at 22° C.). The parameters of the machine in use were:

Line speed: 0.5 m/min

Drying section: 40° C. first and second zone; 50° C. third zone and 60° C. the fourth zone Slot die: average of 195 microns for the anode, which is deposited on Cu substrate and 390 microns for the cathode, which is deposited on Al substrate.

Electrode Densification Procedure

The electrodes are then densified by calendaring. Thus, the final thickness of the anode is 71 μm while the thickness of the cathode is 76 μm.

General Procedure for the Manufacture of Membranes Using the Liquid Medium (L-A) at Lab Scale with a Non-Continuous Process (Batch Wise).

1.5 g of either polymer 2-Comp or polymer (F-A) was dissolved in 8.5 g of acetone at 60° C. thereby providing a solution containing 15% by weight of said polymer. The solution was homogeneous and transparent after homogenization at room temperature. DBTDL (0.015 g) was then added.

The solution was homogenized at 60° C. TSPI (0.060 g) was added thereto. The solution was kept at 60° C. for about 90 min so as to let isocyanate functional groups of TSPI to react with the hydroxyl groups of the polymer.

In the next step, the liquid medium (L-A) was added to the solution so obtained.

The weight ratio [m$_{medium\ (L-A)}$/(m$_{medium\ (L-A)}$+m$_{polymer}$)] was 80%.

After homogenization at 60° C., formic acid was added.

TEOS was then added thereto. The quantity of TEOS was calculated from the weight ratio (m$_{SiO2}$/m$_{polymer}$) assuming total conversion of TEOS into SiO$_2$. This ratio was 10%.

The quantity of formic acid was calculated from the following equation: n$_{formic\ acid}$/n$_{TEOS}$=7.8.

All the ingredients were fed to the solution mixture so obtained under Argon atmosphere. The solution mixture was spread with a constant thickness onto a PET substrate using a tape casting machine (doctor blade) in a dry room (dew point: −40° C.). The thickness was controlled by the distance between the knife and the PET film.

The solvent was quickly evaporated from the solution mixture and the membrane was obtained. After a few hours, the membrane was detached from the PET substrate. The membrane so obtained had a constant thickness of 32 μm.

General Procedure for the Manufacture of Membranes Using the Liquid Medium (L-A) at Pilot Scale with a Continuous Process.

Solution Preparation:

10 g of either polymer 2 or polymer (F-A)) were dissolved in 67 g of acetone at 60° C. thereby providing a solution containing 13% by weight of said polymer. The solution was homogeneous and transparent after homogenization at room temperature. DBTDL (0.10 g) was then added.

The solution was homogenized at 60° C. TSPI (0.40 g) was added thereto.

The solution was kept at 60° C. for about 90 min so as to let isocyanate functional groups of TSPI to react with the hydroxyl groups of the polymer.

In the next step, the liquid medium (L-A) was added to the solution so obtained.

The weight ratio [m$_{medium\ (L-A)}$/(m$_{medium\ (L-A)}$+m$_{polymer}$)] was 80%.

After homogenization at 60° C., formic acid was added.

TEOS was then added thereto. The quantity of TEOS was calculated from the weight ratio (m$_{SiO2}$/m$_{polymer}$) assuming total conversion of TEOS into SiO$_2$. This ratio was 10%.

The quantity of formic acid was calculated from the following equation: n$_{formic\ acid}$/n$_{TEOS}$=3.27.

All the ingredients were fed to the solution mixture so obtained under Argon atmosphere.

Roll to Roll Slot Die Coating Machine (Ingecal—Tailored Made)

The solution mixture prepared above was fed into the coating machine at room temperature. La machine is in a controlled environment (dew point −20° C. at 22° C.). Parameters of the Machine in use:

Line speed: 1 m/min

Drying section: 40° C. first and second zone; 50° C. third zone and 60° C. the fourth zone.

slot die: average of 300 microns to produce a membrane of about 50 microns which is deposed on a PET substrate.

Example 1

A membrane produced by the continuous process at pilot scale using Polymer (F-A) of the invention is prepared following the above procedure.

The membrane obtained has a thickness of 60 microns and it is easily detached from the substrate and its handling is facilitated thanks to the good mechanical properties of the membrane. The mechanical properties in both directions have been recorded: MD (machine direction) and TD (transverse direction) are shown in Table 2.

Example 2

A membrane produced by the continuous process at pilot scale using Polymer 2-Comp is prepared following the above procedure. The membrane obtained has a thickness of 55 microns and it is detached with difficulty from the substrate. Its handling is also difficult and it can be easily damaged because of a lack of good mechanical properties.

Example 3

A membrane produced by the batch wise non continuous process at lab scale using Polymer (F-A) of the invention is prepared following the above procedure. The membrane obtained has a thickness of 41 microns and it is easily detached from the substrate. The mechanical properties of the membrane are presented in Table 2.

Comparative Example 4

A membrane produced by the batch wise non continuous process at lab scale using Polymer 2-Comp is prepared following the above procedure. The membrane obtained has a thickness of 48 microns and it is detached from the substrate with difficulty to avoid any damage of it. The mechanical properties of the membrane are presented in Table 2.

TABLE 2

| Membrane | | Strain at break, % | Stress at break, MPa |
|---|---|---|---|
| 1 | MD | 134.1 | 1.03 |
|  | TD | 153.7 | 1.09 |
| 3 |  | 210.1 | 1.13 |
| Comp-4 |  | 39.9 | 0.44 |

Example 5

Manufacture of a Lithium-Ion Battery with the Membrane of Example 1.

A pouch cell (4×4 cm) was prepared by placing the membrane prepared according to the general procedure as detailed above between the cathode (2.2 mAh/cm$^2$) and the anode (2.8 mAh/cm$^2$).

The pouch cell has capacity of 35.3 mA/h.

The pouch cell was cycled between 2.8 and 4.15V.

After a step of 2 cycles at C/20-D/20, the test protocol was carried out according to successive series of 5 cycles at C/10-D/10, C/5-D/5, C/2-D/2, C/2-D, C/2-2D.

The is charge capacity values of the pouch cell so obtained under different discharge rates are set forth in Table 3 here below.

TABLE 3

| Rate |  | Average Discharge Capacity [mAh/g] | [%] |
|---|---|---|---|
| 0.05 | Discharge D/20 | 140 | 100 |
| 0.1 | Discharge D/10 | 135.6 | 96.4 |
| 0.2 | Discharge D/5 | 128 | 91 |
| 0.5 | Discharge D/2 | 111.5 | 79.6 |
| 1 | Discharge D | 103.8 | 73.7 |
| 2 | Discharge 2D | 69 | 49.1 |
| 0.05 | Discharge D/20 | 134.4 | 95.5 |

It has been found that the secondary battery of the invention works properly.

The invention claimed is:

1. A membrane for an electrochemical device, said membrane comprising:
   (a) at least one polymer (F-h), wherein the at least one polymer (F-h) is at least one fluoropolymer hybrid organic/inorganic composite comprising inorganic domains, said hybrid being obtained by reaction between:
   at least one polymer (F), wherein the at least one polymer (F) is at least one fluoropolymer comprising:
   (i) recurring units derived from at least one fluorinated monomer (FM),
   (ii) recurring units derived from at least one (meth)acrylic monomer (MA) of formula:

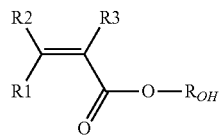

wherein each of R1, R2, R3, equal or different from each other, is independently a hydrogen atom or a $C_1$-$C_3$ hydrocarbon group, and $R_{OH}$ is a $C_1$-$C_5$ hydrocarbon moiety comprising at least one hydroxyl group, and
   (iii) optionally recurring units derived from at least one fluorinated monomer (FM2) different from VDF;
   wherein the at least one polymer (F) has an intrinsic viscosity measured in dimethylformamide at 25° C. higher than 0.90 dl/g and lower than 6.0 dl/g; and
   at least one metal compound (M) of formula (I):

$$X_{4-m}AY_m \qquad (I)$$

wherein m is an integer from 1 to 4, A is a metal selected from the group consisting of Si, Ti and Zr, Y is a hydrolysable group, X is a hydrocarbon group, optionally comprising one or more functional groups,
   wherein the inorganic domains are obtained by grafting at least one metal compound (M) to the polymer (F) through reaction of said at least one metal compound (M) with at least a fraction of the $R_{OH}$ groups of the (meth)acrylic monomer (MA); and
   (b) a liquid medium (L).

2. The membrane according to claim 1, wherein the at least one polymer (F) is a terpolymer VDF-AA-HFP.

3. The membrane according to claim 1, wherein the liquid medium (L) comprises at least one organic carbonate and at least one metal salt (MS).

4. The membrane according to claim 1, wherein X in the at least one metal compound (M) is $R^A$ and Y is $OR^B$, wherein $R^A$ and $R^B$, equal to or different from each other and at each occurrence, are independently selected from $C_1$-$C_{18}$ hydrocarbon groups, wherein $R^A$ optionally comprises at least one functional group.

5. The membrane according to claim 1, wherein the at least one meth(acrylic) monomer (MA) is selected from the following:

hydroxyethyl acrylate (HEA) of formula:

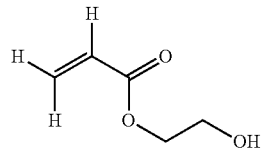

2-hydroxypropyl acrylate (HPA) of either of formulae:

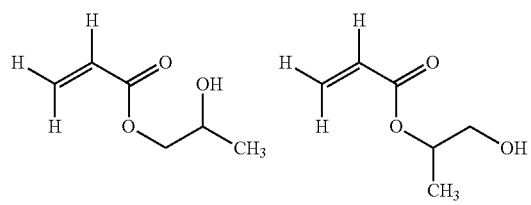

or mixtures thereof.

6. The membrane according to claim 1, wherein the at least one metal compound (M) is a compound (M'), wherein the compound (M') is selected from the group consisting of: trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate and triethoxysilyl hexyl isocyanate.

7. The membrane according to claim 1, wherein the at least one metal compound (M) is a non-functional compound (M2), wherein the non-functional compound (M2) is selected from the group consisting of: trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate and tetra-n-stearyl zirconate.

8. The membrane according to claim 1 wherein the at least one monomer (FM) is selected from the group consisting of:
$C_2$-$C_8$ perfluoroolefins;
$C_2$-$C_8$ hydrogenated fluoroolefins;
perfluoroalkylethylenes of formula $CH_2=CH$-$R_{f0}$ wherein Rm is a $C_1$-$C_6$ perfluoroalkyl;
chloro- and/or bromo- and/or iodo-$C_2$-$C_6$ fluoroolefins;
$CF_2=CFOX_0$ (per)fluoro-oxyalkylvinylethers wherein Xo is a $C_1$-$C_{12}$ alkyl group, a $C_1$-$C_{12}$ oxyalkyl group or a $C_1$-$C_{12}$ (per)fluorooxyalkyl group having one or more ether groups;
(per)fluoroalkylvinylethers of formula $CF_2=CFOCF_2OR_{f2}$ wherein $R_{f2}$ is a $C_1$-$C_6$ fluoro- or perfluoroalkyl group or a $C_1$-$C_6$ (per)fluorooxyalkyl group having one or more ether groups;
functional (per)fluoro-oxyalkylvinylethers of formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups; and
fluorodioxoles.

9. The membrane according to claim 1, wherein the at least one polymer
(F-h) is obtained by reaction between:
the at least one polymer (F) as defined in claim 1,
at least one metal compound (M'); and
at least one metal compound (M2),
wherein the at least one metal compound (M') is selected from the group consisting of:
trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate and triethoxysilyl hexyl isocyanate and
wherein the at least one metal compound (M2) is selected from the group consisting of:
trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate and tetra-n-stearyl zirconate.

10. The membrane according to claim 1, wherein the at least one metal compound (M) is a functional compound (M1) wherein the functional compound (M1) is selected from the group consisting of: vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

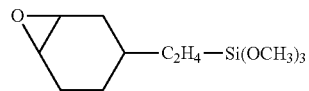

glycidoxypropylmethyldiethoxysilane of formula:

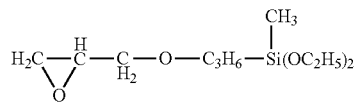

glycidoxypropyltrimethoxysilane of formula:

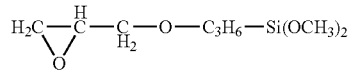

methacryloxypropyltrimethoxysilane of formula:

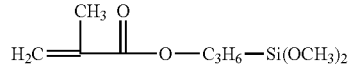

aminoethylaminpropylmethyldimethoxysilane of formula:

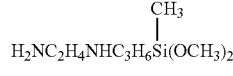

aminoethylaminpropyltrimethoxysilane of formula: $H_2NC_2H_4NHC_3H_6Si(OCH_3)_3$
3-aminopropyltriethoxysilane, 3-phenylaminopropyltrimethoxysilane,
3-chloroisobutyltriethoxysilane, 3-chloropropyltrimethoxysilane,
3-mercaptopropyltriethoxysilane, 3-mercaptopropyltrimethoxysilane,
n-(3-acryloxy-2-hydroxypropyl)-3-aminopropyltriethoxysilane,
(3-acryloxypropyl)dimethylmethoxysilane, (3-acryloxypropyl)methyldichlorosilane, (3-acryloxypropyl)methyldimethoxysilane, 3-(n-allyl amino)propyltrimethoxysilane,
2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

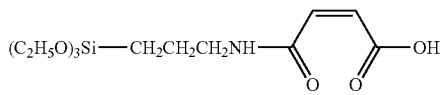

3-(trihydroxysilyl)-1-propane-sulphonic acid of formula $HOSO_2-CH_2CH_2CH_2-Si(OH)_3$,
N-(trimethoxysilylpropyl)ethylene-diamine triacetic acid, and its sodium salts,
3-(triethoxysilyl)propyl succinic anhydride of formula:

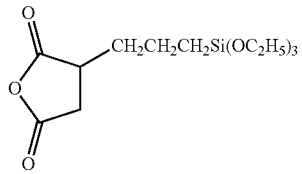

acetamidopropyltrimethoxysilane of formula $H_3C-C(O)NH-CH_2CH_2CH_2-Si(OCH_3)_3$, and
alkanolamine titanates of formula $Ti(L)_t(OR)z$, wherein L is an amine-substitued alkoxy group,
R is an alkyl group, and x and y are integers such that t+z=4.

11. The membrane according to claim 1, wherein the intrinsic viscosity of polymer (F), measured in dimethylformamide at 25° C., is lower than 5.0 dl/g.

12. The membrane according to claim 11, wherein the intrinsic viscosity of polymer (F), measured in dimethylformamide at 25° C., is lower than 4.50 dl/g.

13. The membrane according to claim 1, wherein the at least one fluorinated monomer (FM2) is selected from the group consisting of chlorotrifluoroethylene (CTFE), hexafluoropropylene (HFP) and tetrafluoroethylene (TFE).

14. The membrane according to claim 13, wherein the at least one fluorinated monomer (FM2) is selected from the group consisting of hexafluoropropylene (HFP) and tetrafluoroethylene (TFE).

15. The membrane according to claim 1, wherein the at least one polymer (F) is a partially fluorinated fluoropolymer comprising recurring units derived from vinylidene fluoride (VDF), the at least one (meth)acrylic monomer (MA) and the at least one fluorinated monomer (FM2).

16. The membrane according to claim 15, wherein the at least one polymer (F) comprises recurring units derived from:
at least 60% by moles of the vinylidene fluoride (VDF),
from 0.01% to 10% by moles of at the least one (meth)acrylic monomer (MA), and
from 0.1% to 15% by moles of the at least one fluorinated monomer (FM2) selected from vinyl fluoride ($VF_1$), chlorotrifluoroethylene (CTFE), hexafluoropropylene (HFP), tetrafluoroethylene (TFE) and trifluoroethylene (TrFE).

17. The membrane according to claim 16, wherein the at least one polymer (F) comprises recurring units derived from:
at least 85% by moles of the vinylidene fluoride (VDF),
from 0.1% to 3% by moles of the at least one (meth)acrylic monomer (MA), and
from 0.1% to 10% by moles of the at least one fluorinated monomer (FM2) selected from the vinyl fluoride ($VF_1$), the chlorotrifluoroethylene (CTFE), the hexafluoropropylene (HFP), the tetrafluoroethylene (TFE) and the trifluoroethylene (TrFE).

18. An electrochemical device comprising at least one membrane as defined in claim 1 between a positive electrode and a negative electrode.

19. A process for the manufacture of a membrane for an electrochemical device, said process comprising:
(A) providing at least one solution of the polymer (F-h) as defined in claim 1 in a liquid medium (L);
(B) processing the solution obtained in step (A) into a polymer electrolyte membrane; and
(C) drying the polymer electrolyte membrane provided in step (B).

20. The process according to claim 19, wherein in step (B) the solution of polymer (F-h) in the liquid medium (L) is processed in a continuous process.

* * * * *